(12) United States Patent
Rattunde

(10) Patent No.: US 9,676,080 B2
(45) Date of Patent: Jun. 13, 2017

(54) TWIN CLAMP DEVICE

(71) Applicant: Rattunde & CO GMBH, Ludwigslust (DE)

(72) Inventor: Ulrich Rattunde, Bentswisch (DE)

(73) Assignee: Rattunde & Co GmbH, Ludwigslust (DE)

( * ) Notice: Subject to any disclaimer, the term of this patent is extended or adjusted under 35 U.S.C. 154(b) by 0 days.

(21) Appl. No.: 14/783,576

(22) PCT Filed: Mar. 25, 2014

(86) PCT No.: PCT/EP2014/056001
§ 371 (c)(1),
(2) Date: Oct. 9, 2015

(87) PCT Pub. No.: WO2014/166736
PCT Pub. Date: Oct. 16, 2014

(65) Prior Publication Data
US 2016/0082572 A1   Mar. 24, 2016

(30) Foreign Application Priority Data

Apr. 10, 2013  (DE) .................. 10 2013 103 587

(51) Int. Cl.
*B25B 1/20* (2006.01)
*B25B 1/24* (2006.01)
(Continued)

(52) U.S. Cl.
CPC ............ *B25B 1/2478* (2013.01); *B23D 45/12* (2013.01); *B23D 47/04* (2013.01); *B23D 47/06* (2013.01); *B25B 1/06* (2013.01); *B25B 1/20* (2013.01)

(58) Field of Classification Search
CPC  B25B 1/2478; B25B 1/06; B25B 1/00; B25B 1/2426; B25B 1/2405; B25B 1/241;
(Continued)

(56) References Cited

U.S. PATENT DOCUMENTS

| 5,330,167 A | 7/1994 | Plumb |
| 2006/0255521 A1 | 11/2006 | Brunner |

FOREIGN PATENT DOCUMENTS

| CH | 413751 A | 5/1966 |
| CN | 101905269 B | 9/2012 |

(Continued)

*Primary Examiner* — Larry E Waggle, Jr.
*Assistant Examiner* — Nirvana Deonauth
(74) *Attorney, Agent, or Firm* — Bay State IP, LLC

(57) ABSTRACT

A twin clamp comprising a first individual clamp, having an inner first clamping jaw and an outer first clamping jaw, a second individual clamp, having an inner second clamping jaw and an outer second clamping jaw. The individual clamps are coupled to one another via a first mounted clamping lever and a second mounted clamping lever. The first clamping lever is connected to the inner first clamping jaw and to the outer first clamping jaw; the second clamping lever is connected to the inner second clamping jaw and to the outer second clamping jaw, and comprising a first spring which pushes apart the inner first clamping jaw and the outer first clamping jaw counter to force exerted by the first clamping lever, and a second spring, which pushes apart the inner second clamping jaw and the outer second clamping jaw counter to force exerted by the second clamping lever.

6 Claims, 10 Drawing Sheets

(51) Int. Cl.
*B23D 45/12* (2006.01)
*B23D 47/04* (2006.01)
*B25B 1/06* (2006.01)
*B23D 47/06* (2006.01)

(58) Field of Classification Search
CPC .. B25B 3/00; B25B 3/161; B25B 5/00; B25B 7/00; B23D 47/06; B23D 47/04
See application file for complete search history.

(56) References Cited

FOREIGN PATENT DOCUMENTS

| | | |
|---|---|---|
| DE | 20001092 U1 | 3/2000 |
| WO | 2012/061692 A1 | 5/2012 |

TWIN CLAMP DEVICE

CROSS REFERENCE TO RELATED APPLICATION

This application is for entry into the U.S. National Phase under §371 for International Application No. PCT/EP2014/056001 having an international filing date of Mar. 25, 2014, and from which priority is claimed under all applicable sections of Title 35 of the United States Code including, but not limited to, Sections 120, 363, and 365(c), and which in turn claims priority under 35 USC 119 to German Application No. 102013103587.6 filed on Apr. 10, 2013.

The invention relates to a twin clamp for two longitudinal profiles arranged next to one another and oriented in a longitudinal direction.

In modern sawing systems, longitudinal profiles, particularly metal pipes, are cut to length in a highly precise manner. Clamping devices are used for feeding the metal pipes and also for holding the metal pipes during the actual sawing operation. Clamping devices are known in the prior art in the form of single or double clamps. In single or double clamps, the pipes are clamped in direct contact with one another.

CH 413 751 A discloses a device for centrally clamping cylindrical or approximately cylindrical workpieces, with which, however, it is disadvantageously not possible for two pipes to be clamped simultaneously.

US 2006/0255521 A1 discloses a double clamping device for two pipes, which permits the manual clamping of two pipe sections, wherein the clamping jaws are precisely adapted to the rounded shapes of the pipe sections to be clamped and therefore pipes having different diameters cannot be clamped using the same jaw. On the other hand, the spatial position of the central axis changes when clamping pipes of different diameter, so that machine-based post-processing, for example in order to cut the pipes to length in a highly precise manner, is not possible with sufficient precision.

Also known are twin clamps which allow a simultaneous but mutually contact-free clamping of two pipes. However, the known twin clamps exhibit considerable disadvantages.

One type of known twin clamp, developed by the applicant, comprises one intermediate clamping piece and two outer clamping jaws which are movable relative to one another. However, the outer surfaces of the pipe are easily scratched as the pipe is advanced through the twin clamp. In addition, the axis spacing between the two pipes changes as the pipe diameter changes.

Another type of known twin clamp, likewise developed by the applicant, comprises two double clamping jaws which are movable relative to one another, the clamping effect of which is nevertheless dependent, in a very sensitive manner, on the identical pipe diameter.

The object of the present invention is to provide a twin clamp which eliminates the abovementioned disadvantages.

The object is achieved by a twin clamp of the type mentioned in the introduction. The twin clamp comprises a first individual clamp, which has an inner first clamping jaw and an outer first clamping jaw, and a second individual clamp, which has an inner second clamping jaw and an outer second clamping jaw. The two individual clamps are mechanically coupled to one another via at least one first movably mounted clamping lever and at least one second movably mounted clamping lever, and the at least one first clamping lever is operatively connected to the inner first clamping jaw and to the outer first clamping jaw while the at least one second clamping lever is operatively connected to the inner second clamping jaw and to the outer second clamping jaw. Also provided is at least one first spring device which pushes apart the inner first clamping jaw and the outer first clamping jaw counter to a force exerted by the at least one first clamping lever, and at least one second spring device which pushes apart the inner second clamping jaw and the outer second clamping jaw counter to a force exerted by the at least one second clamping lever.

The coupling between the two individual clamps, which consists of at least one first spring device and at least one second spring device and also of the first and second clamping lever together with a common clamping lever pin, is advantageously configured in such a way that bearing faces open and close concentrically around the pipes so that the twin clamp in the open state allows the pipes to be pushed through without scraping along the bearing faces. Furthermore, the twin clamp is suitable for simultaneously clamping pipes of different external diameter, it being possible for both pipes to be securely clamped. In addition, the axis spacing of the two pipes is the same regardless of the pipe diameter.

Preferably, the first and second clamping levers are mutually supported against one another on the rear side. They therefore do not need to be additionally mounted.

In one preferred embodiment of the invention, the at least one first clamping lever and the at least one second clamping lever are mounted such as to be able to rotate about a common axis. The common axis may be guided through a clamping lever pin, which is preferably freely movable.

Advantageously, the common axis is freely movable relative to a central clamp on which the twin clamp is mounted, that is to say that the axis is not fixed to a housing or to the central clamp but rather is in principle freely movable during the clamping operation. The clamping lever pin is advantageously not mounted.

In one preferred embodiment of the invention, the at least one first clamping lever bears against the inner first clamping jaw and the outer first clamping jaw, and the at least one second clamping lever bears against the inner second clamping jaw and the outer second clamping jaw. Advantageously, the clamping levers are not in fixed contact with the clamping jaws but rather merely form, by resting, a connection for transmitting force between the bearing face of the clamping lever and the clamping jaw.

Preferably, the first clamping lever and the second clamping lever each have a plane of mirror symmetry. As a result, the clamping levers can be produced in a particularly cost-effective manner.

Preferably, the first and the second individual clamps are arranged on a central clamp arrangement. The central clamp arrangement advantageously has two supports which are moved relative to one another symmetrically in a clamping direction perpendicular to the longitudinal direction. One of the individual clamps is mounted on each of the two supports, said individual clamps being operatively connected to one another via the coupling mechanism.

The invention will be described on the basis of an example of embodiment in ten figures. In the figures.

Figure 1:
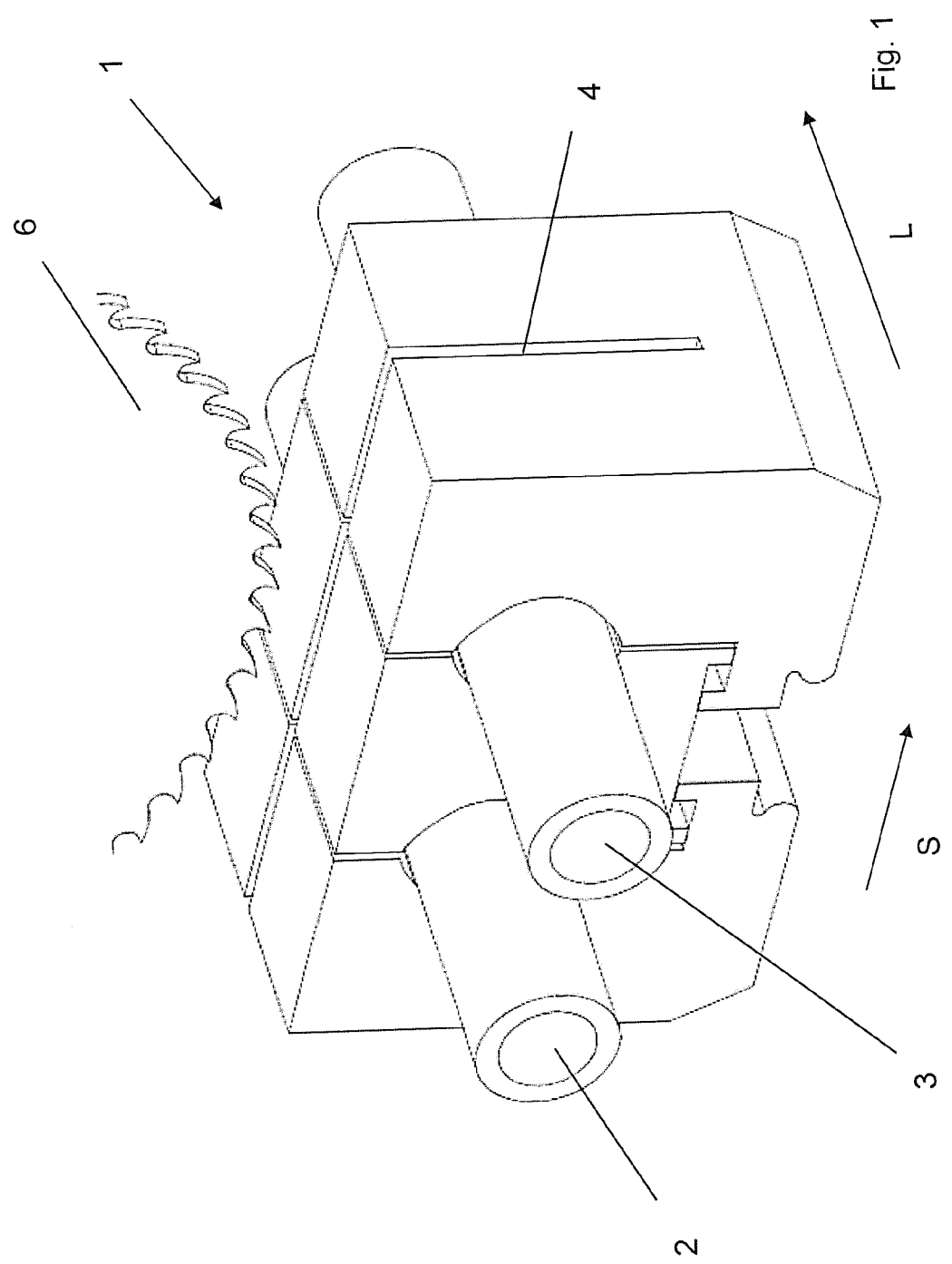
FIG. 1 shows a perspective view of a known twin clamp.

The known twin clamp 1 shown in FIG. 1 is intended for clamping two longitudinal profiles, in particular metal longitudinal profiles, preferably metal pipes 2, 3. The two pipes 2, 3 are oriented in a longitudinal direction L, and they are arranged parallel next to one another and at a distance from one another. The twin clamp 1 has a central slot 4 running perpendicularly in a clamping direction S relative to the longitudinal direction L of the pipes 2, 3, into which slot a saw blade 6 is moved during the cutting operation and cuts the two pipes 2, 3.

Figure 2:
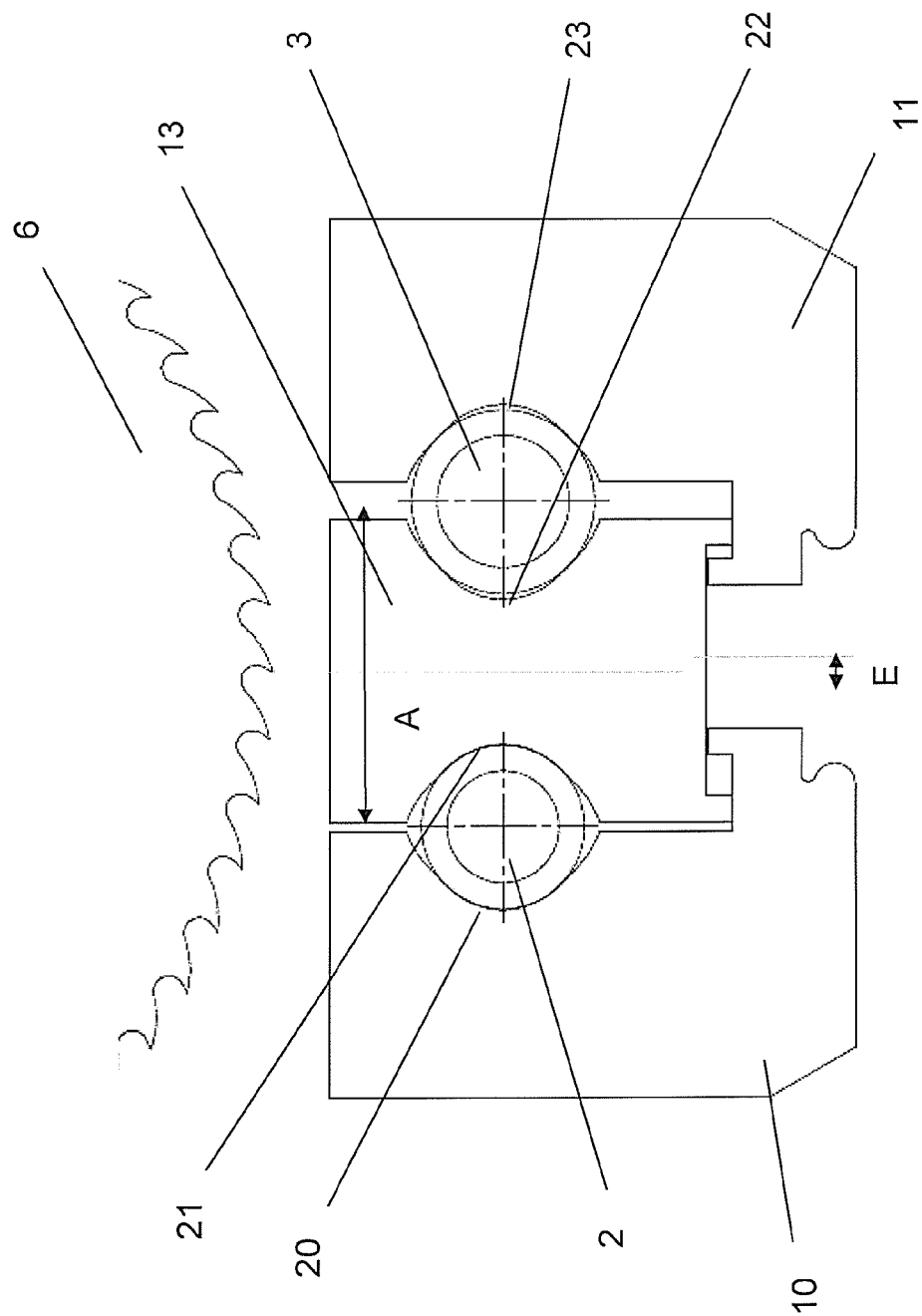
FIG. 2 shows a front view of the twin clamp in FIG. 1.

FIG. 2 shows the twin clamp 1 in a front view. It comprises a first clamping jaw 10 and a second clamping jaw 11, which clamping jaws are movable relative to one another in the clamping direction S perpendicular to the longitudinal direction L of the pipes 2, 3. To this end, the first and the second clamping jaws 10, 11 are arranged on a central clamp arrangement (not shown) which allows a symmetrical movement of the clamping jaws 10, 11 in the clamping direction S. A movable intermediate clamping piece 13 is provided between the first clamping jaw 10 and the second clamping jaw 11. Two first bearing faces 20, 21 for the first pipe 2 and two second bearing faces 22, 23 for the second pipe 3 on the first clamping jaw 10 and second clamping jaw 11, respectively, and along the intermediate clamping piece 13 are each of prismatic shape, that is to say that they have a more funnel-shaped form differing from the circular form, in order thus to enable rotation-free clamping of various pipes 2, 3 of different diameter D1, D2.

The spacing in the clamping direction S between the two pipes 2, 3 is determined by the geometry of the intermediate clamping piece 13 and by the pipe diameters D1, D2. With the twin clamp 1, pipes 2, 3 of different diameter D1, D2 can be clamped in different clamping operations. The pipes 2, 3 may also have a different diameter D1, D2 from one another in one clamping operation. A clamping range of the twin clamp 1 is approximately five to ten millimeters, that is to say it is possible to clamp pipe diameters of between for example D1=D2=31.5 mm to 36.5 mm.

One disadvantage on the twin clamp 1 is that the spacing A between the pipe axes depends on the diameter D1, D2 of the pipes 2, 3. In order to keep a constant spacing A between different clamping operations with pipes 2, 3 of different diameter D1, D2, a separate intermediate clamping piece 13 is required for each pipe diameter D1, D2. Another disadvantage is that fluctuations in the axis spacing, which are disadvantageous for subsequent machining operations, particularly bevelling, occur due to external diameter tolerances of the pipes 2, 3. The two pipe sections that have been cut to length are conveyed onwards with the same axis spacing and are subjected to the subsequent machining while maintaining the axis spacing. Customary external diameter tolerances are approximately ±0.1 mm. In the case of a diameter D1=D2=34 mm, this leads to a deviation of the axis spacing A of the pipes 2, 3 of A=34 mm±−0.1 mm and to a tolerance in the axis spacing A of approximately 0.29 mm and an asymmetry E of approximately 0.4 mm.

Another problem is that the intermediate clamping piece 13 does not lift away from the pipes 2, 3 when the twin clamp 1 is opened in order to advance the pipes 2, 3, and therefore scratches may occur to external walls of the pipes 2, 3 as the latter are pushed through. The advancing movement takes place by means of a pincer-type feed system (not shown).

Figure 3:
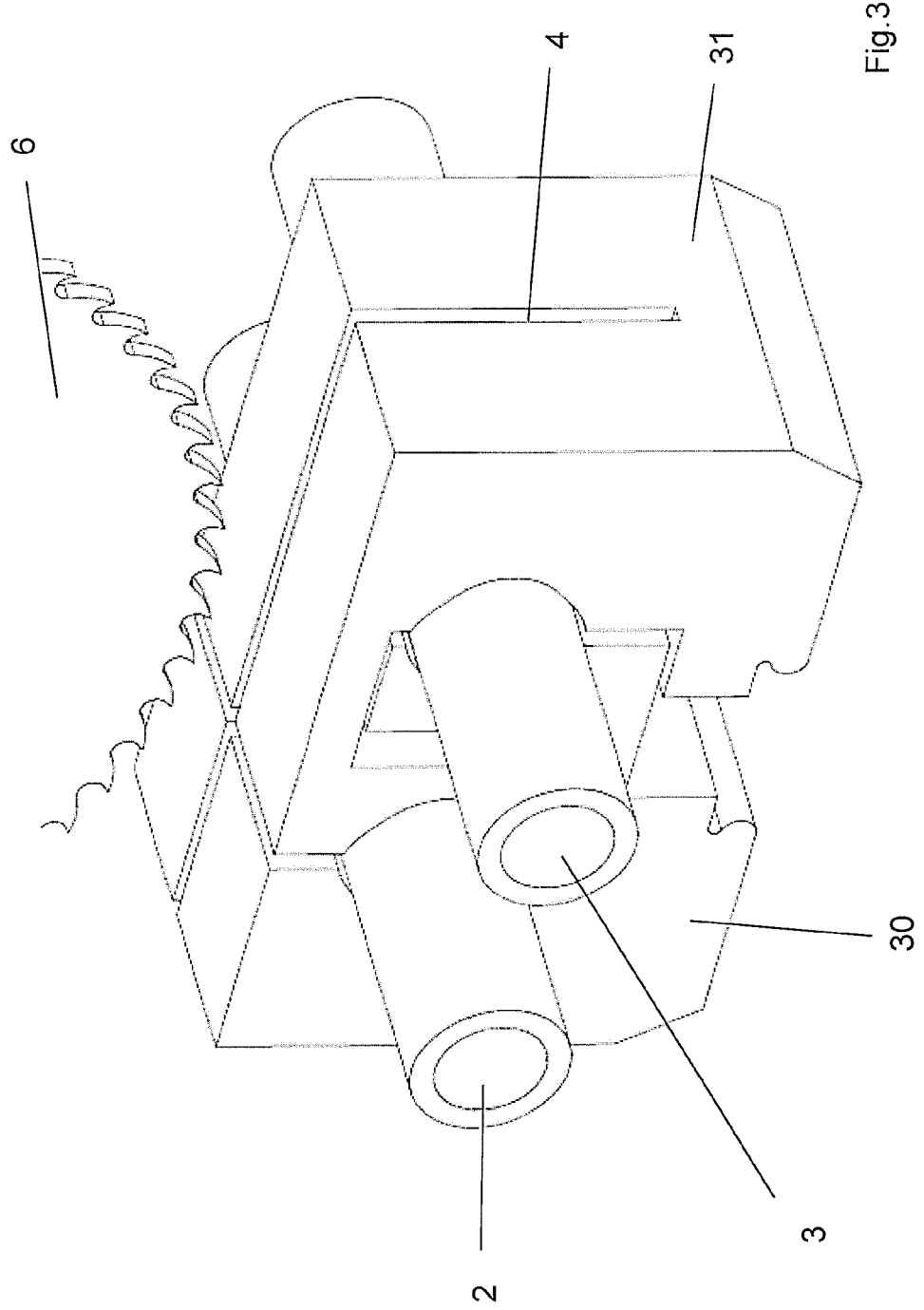
FIG. 3 shows a further known twin clamp in a perspective view.
Figure 4:
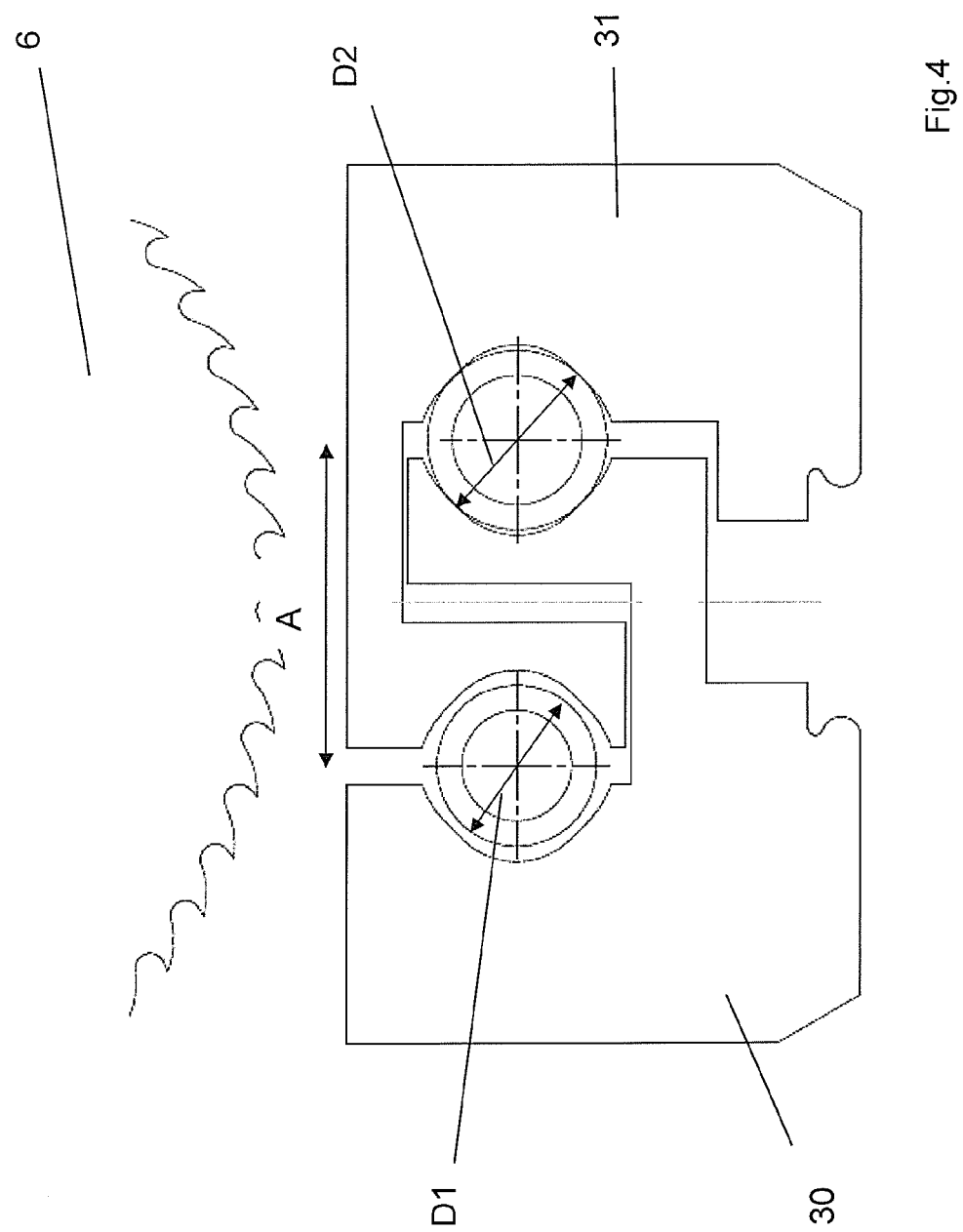
FIG. 4 shows a front view of the known twin clamp in FIG. 3.

FIG. 3 shows a further known twin clamp 1. Here, too, the two pipes 2, 3 are fed into the twin clamp 1 by a pincer-type feed system (not shown). Here, too, a slot 4 running in the clamping direction S perpendicular to the longitudinal direction L is provided for the saw blade 6.

The twin clamp 1 has a first and a second double clamping jaw 30, 31, which are mounted on a central clamp (not shown). In the twin clamp 1, the axis spacing A is always constant over the entire diameter clamping range. One problem is that the twin clamp is overdetermined. That is to say, when the diameter D1 of the first pipe 2 is somewhat smaller than the diameter D2 of the second pipe 3, only the pipe 3 having the larger diameter D2 is securely clamped, and vice versa. The diameter tolerances can only be compensated by elastic deformation of the pipes 2, 3 and/or of the twin clamp 1, for example by means of at least one spring-loaded bearing face 20, 21, 22, 23. The twin clamp 1 can be used only for very narrow diameter tolerances. The tolerances of ±0.1 mm which usually occur cannot be compensated using the twin clamp 1.

Figure 5:
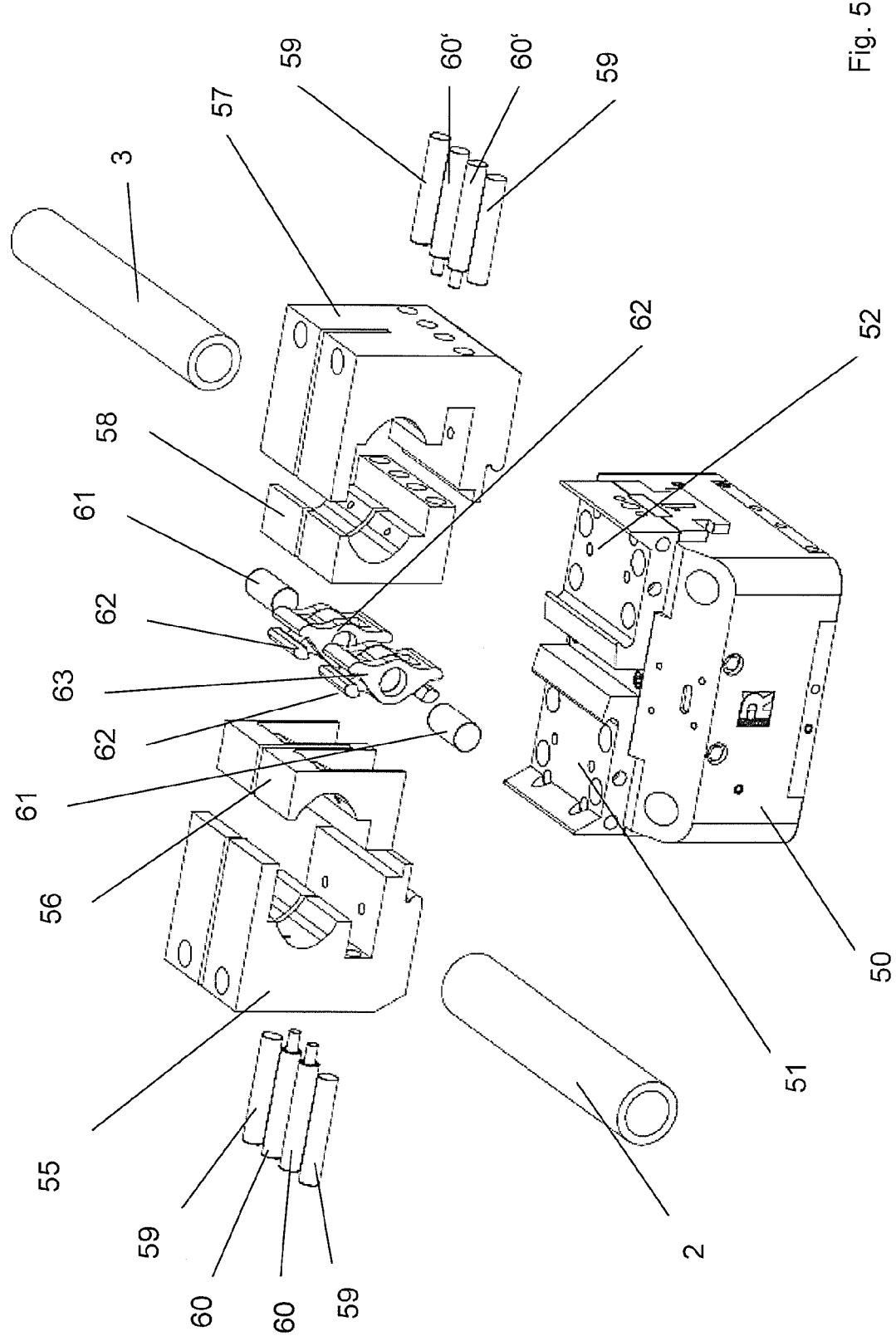
FIG. 5 shows a component view of a twin clamp according to the invention.

The twin clamp 1 according to the invention is shown in a component view in FIG. 5. It comprises a central clamp 50 with a first and a second support 51, 52 which are movable back and forth relative to one another in the clamping direction S in a precisely symmetrical manner. The twin clamp 1 also comprises a first outer clamping jaw 55 and a first inner clamping jaw 56 and also a second outer clamping jaw 57 and a second inner clamping jaw 58, which form a spring-loaded connection with one another via guide pins 59 and two first compression spring pins 60 and two second compression spring pins 60'. The two inner clamping jaws 56, 58 are coupled to one another via a coupling mechanism which consists here of two assembly kits, each assembly kit comprising a clamping lever pin 61 and respectively a first clamping lever 62 and a second clamping lever 63. Also shown are the first and the second pipe 2, 3 which are to be clamped.

Figure 6:
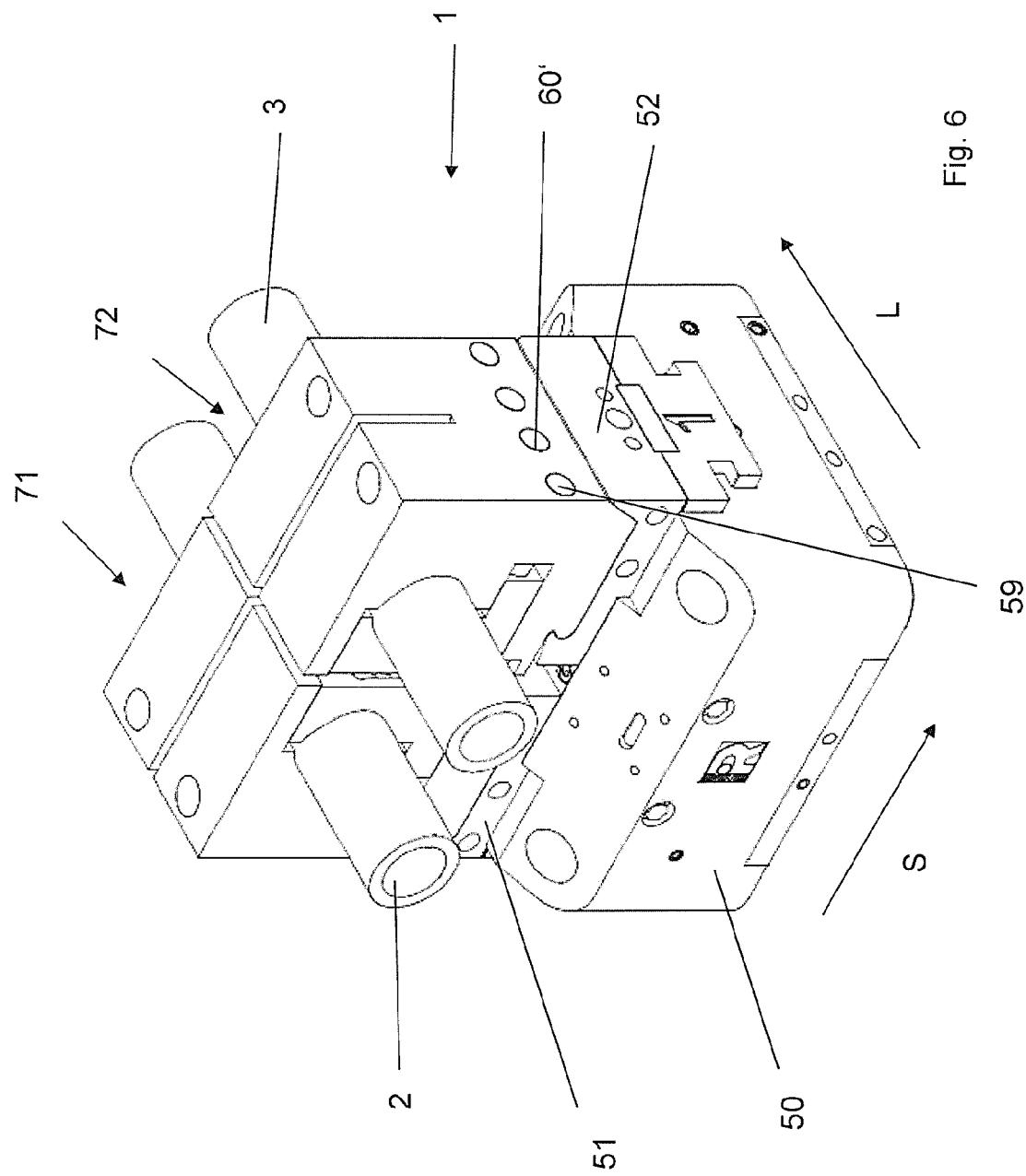
FIG. 6 shows the twin clamp in FIG. 5 in a perspective view.

The twin clamp 1 of FIG. 5 is shown in an assembled state in FIG. 6. The first outer clamping jaw 55 and the first inner clamping jaw 56 are components of a first individual clamp 71; the second outer clamping jaw 57 and the second inner clamping jaw 58 are components of a second individual clamp 72. The first individual clamp 71 is mounted on the first support 51 and the second individual clamp 72 is mounted on the second support 52 of the central clamp 50. The central clamp 50 allows the two supports 51, 52 to be moved away from one another and towards one another in a precisely symmetrical manner in the clamping direction S perpendicular to the longitudinal direction L of the pipes 2, 3. FIG. 6 shows the first pipe 2 and the second pipe 3, clamped respectively in the first individual clamp 71 and in the second individual clamp 72.

Figure 7:
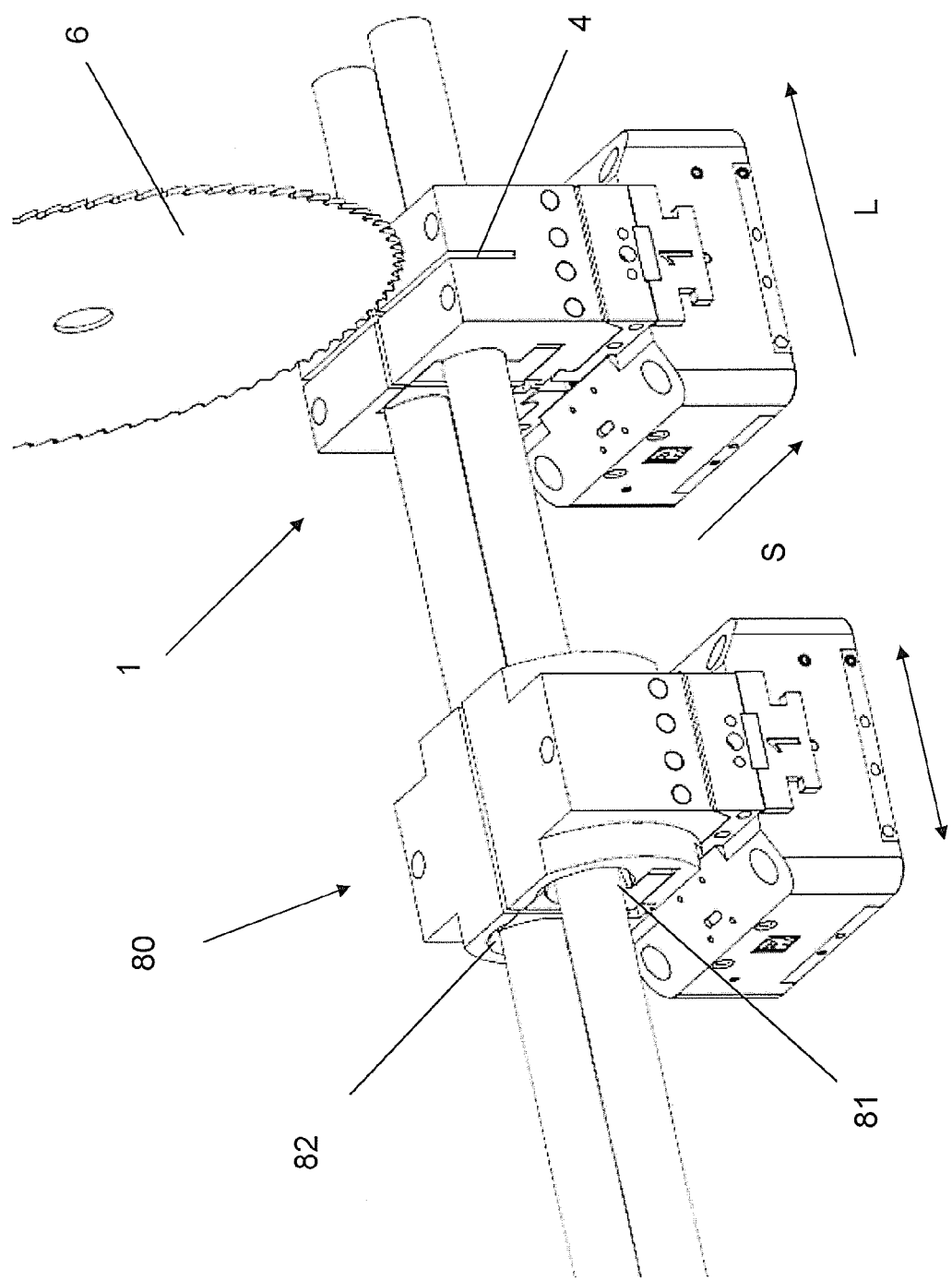
FIG. 7 shows the twin clamp with two clamped pipes.

FIG. 7 shows a schematic view of the arrangement of the twin clamp 1 according to the invention in a pipe cutting machine. The saw blade 6 is arranged outside of the twin clamp 1 above the slot 4 formed over the entire transverse extent in the clamping direction S of the twin clamp 1. The saw blade 6 can be moved into the slot 4 and, as it is moved into the latter, cuts through the two pipes 2, 3. The pipes 2, 3 are preferably metal pipes.

The pipes 2, 3 are pushed through the twin clamp 1 from left to right in FIG. 7, are securely clamped in the twin clamp 1 and are cut to length. Pipe sections that have been cut to length are removed at the right in FIG. 7 by means of a gripping device (not shown). They are conveyed onwards and further processed while maintaining their axis spacing A.

A pincer-type feed system 80, of substantially identical construction to the twin clamp 1, is provided for feeding the two pipes 2, 3 to the twin clamp 1 in the longitudinal direction L. In contrast to the twin clamp 1, the pincer-type feed system 80 has two conical receiving areas 81, 82 for the pipes 2, 3. The pincer-type feed system 80 can be moved back and forth in the longitudinal direction L by means of a moving device (not shown) and thus makes it possible to feed the pipes 2, 3 in a clocked manner to the twin clamp 1 for sawing purposes.

Figure 8:
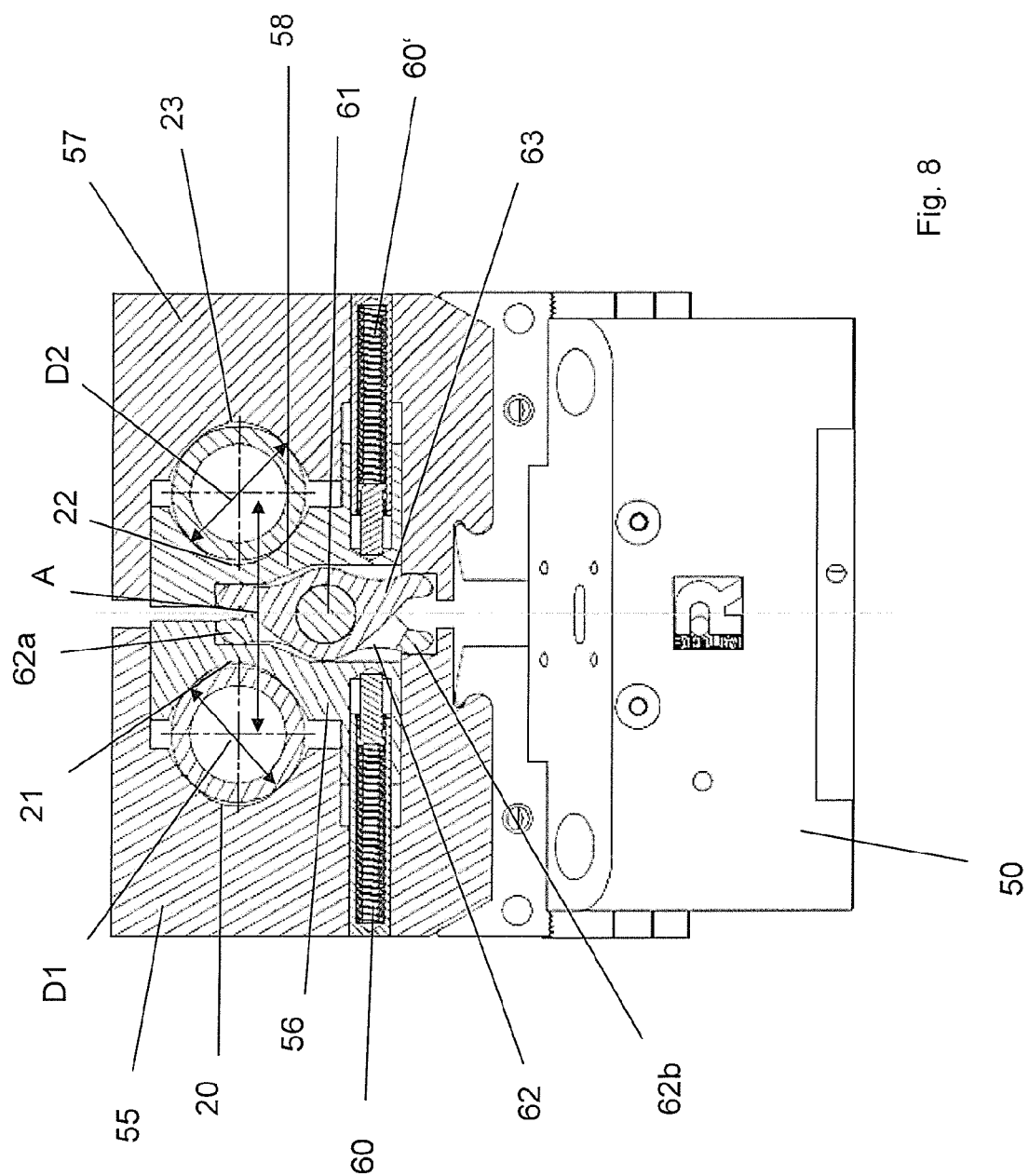
FIG. 8 shows a sectional view of FIG. 6 with two pipes in the clamped state, said pipes being of maximum and identical diameter.
Figure 9:
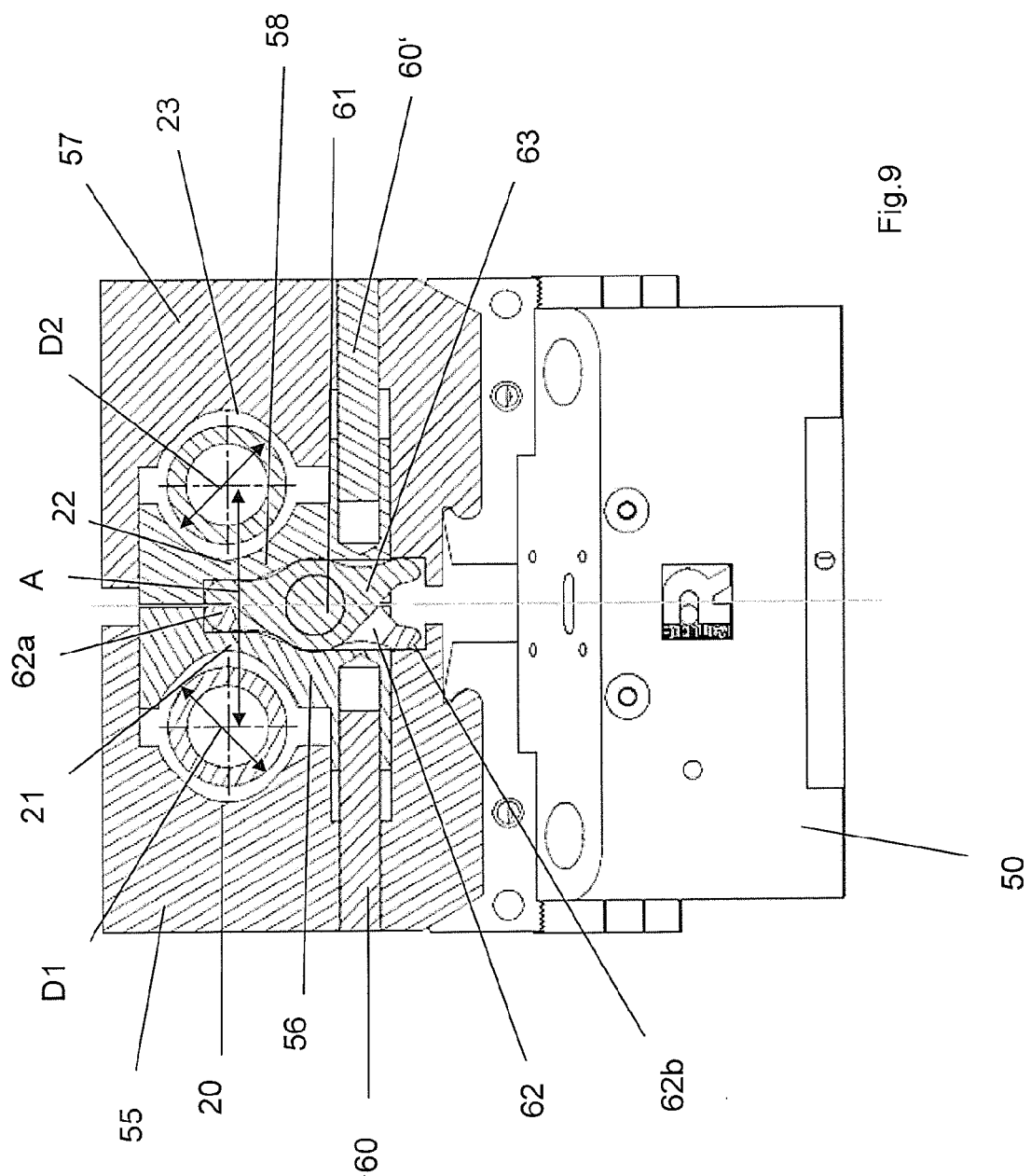
FIG. 9 shows a sectional view of FIG. 6 with two minimum-diameter pipes, in the open state.

FIG. 8 shows the twin clamp 1 of FIGS. 6 and 7 in a sectional view along two compression spring pins 60, 60' and perpendicular to the longitudinal direction L and clamping direction S. The first and the second pipe 2, 3 in FIG. 8 are of maximum and identical external diameter, that is to say a larger pipe diameter cannot be clamped by the illustrated twin clamp 1. FIG. 8 shows the twin clamp 1 in a closed state, while FIG. 9 shows the twin clamp 1 in an open state. In the closed state, the pipes 2, 3 are clamped and the actual cutting operation by means of the saw blade 6 takes place.

FIG. 9 shows a sectional view along the guide pins 59; the sectional plane is perpendicular to the longitudinal direction L and to the clamping direction S.

In the open state in FIG. 9, the pipes 2, 3 are advanced by means of the pincer-type feed system 80 by the desired length of the pipe section that is to be cut. During the advancing movement, the external walls of the pipes do not touch any of the bearing faces 20, 21, 22, 23 and therefore cannot be scratched.

FIG. 8 shows that the first and the second clamping lever 62, 63 are mounted such as to be able to rotate about the common clamping lever pin 61. The clamping lever pin 61 is free, that is to say it is freely movable relative to the central clamp 50, and in particular its ends are not mounted in a fixed position. The second clamping lever 63 has, as shown in FIG. 5, a cutout into which the first clamping lever 62 is introduced. The common clamping lever pin 61 is guided through two central bores of the two clamping levers 62, 63.

The first individual clamp 71 has the first outer clamping jaw 55 and the first inner clamping jaw 56; the first clamping lever 62 bears movably against inner external walls of the first outer clamping jaw 55 and of the first inner clamping jaw 56. The first outer clamping jaw 55 and the first inner clamping jaw 56 are connected to one another in a spring-loaded manner by the two compression spring pins 60, which push apart the two clamping jaws 55, 56. The compression spring pins 60 press the first inner clamping jaw 56 in the direction of the second individual clamp 72 against an arm 62a of the first clamping lever 62 that faces away from the central clamp 50. The first clamping lever 62 is held in position on its rear side by the second clamping lever 63 which is coupled thereto and which exerts a force on the first clamping lever 62. The same applies to the second clamping lever 63 of the second individual clamp 72. The first clamping lever 62 rotates slightly in the clockwise direction and an arm 62b of the first clamping lever 62 that faces towards the central clamp 50 bears against an inner wall of the first outer clamping jaw 55.

Figure 10:
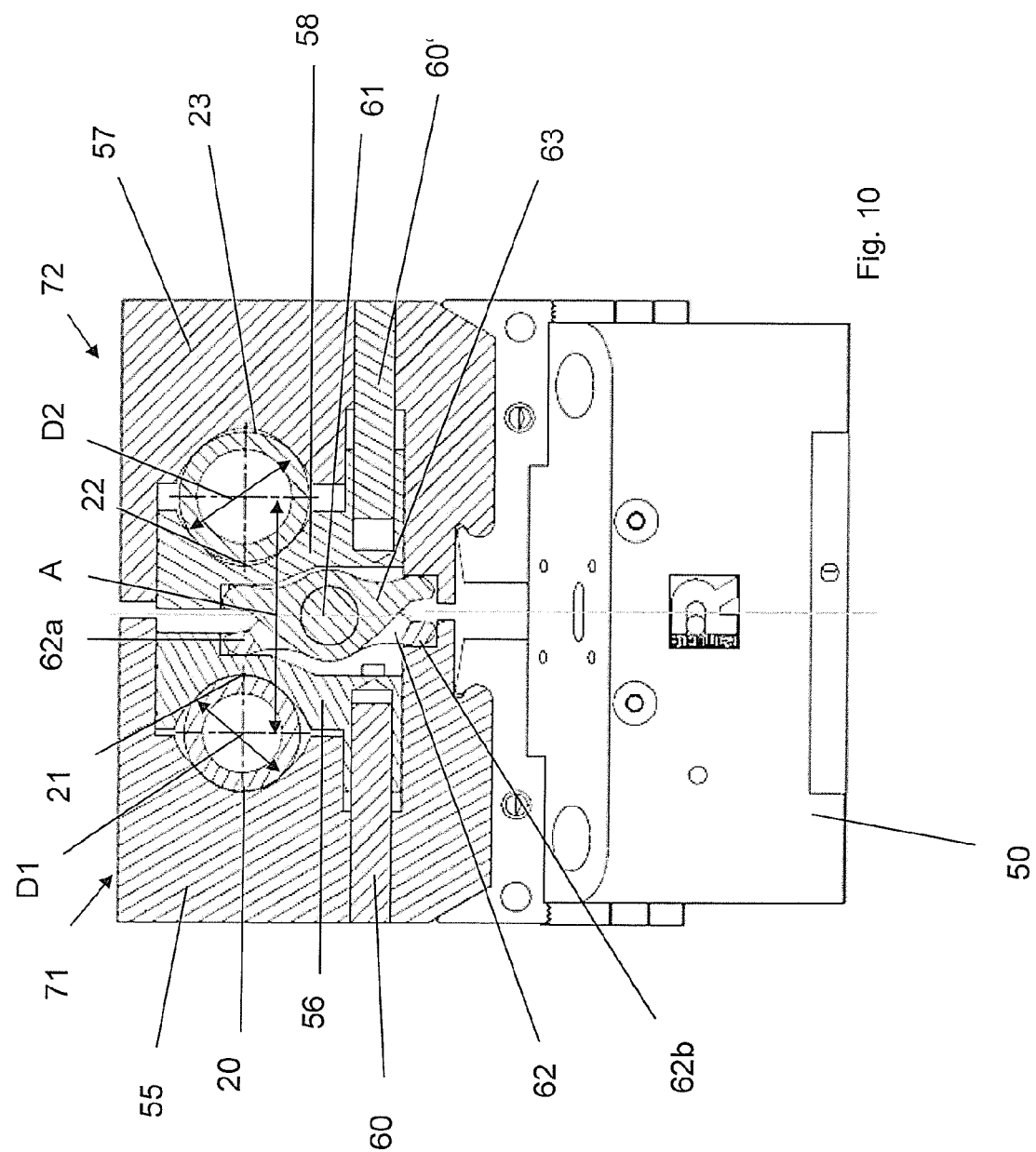
FIG. 10 shows a sectional view, corresponding to FIG. 9, with two pipes of different diameter in the clamped state.

In order to release the twin clamp 1, the two supports 51, 52 are moved apart in a symmetrical manner, that is to say the first outer clamping jaw 55 shown in FIG. 8 is moved outwards, that is to say to the left in FIG. 8, and the second outer clamping jaw 57 shown in FIG. 8 is moved outwards, that is to say to the right in FIG. 8. Due to the spring force of the first compression spring pin 60, the first inner clamping jaw 56 is pushed in the direction of the second individual clamp 72. The first clamping lever 62 is thus given some play to rotate a little further in the clockwise direction, until the arm 62b facing towards the central clamp 50 comes back into contact with the first outer clamping jaw 55. As a result of the rotation of the first clamping lever 62, the one first compression spring pin 60 relaxes further so as to move the first inner clamping jaw 56 slightly in the direction of the second individual clamp 72. The state of the open first individual clamp 71 is shown in FIG. 10. The same applies to the opening of the second individual clamp 72.

Advantageously, the twin clamp 1 opens in such a way that the respective two bearing faces 20, 21 or 22, 23 detach from the first pipe 2 and second pipe 3 in a symmetrical manner and no scratches can occur to external walls of the pipe as the pipe 2, 3 is pushed through the open bearing faces 20, 21, 22, 23.

The twin clamp 1 according to the invention is also suitable for clamping pipes 2, 3 of considerably different diameter D1, D2, as shown in FIG. 10. The cut face likewise runs along the guide pins 59, and it is perpendicular to the longitudinal direction L and to the clamping direction S. There, the first pipe 2 has a smaller diameter D1 than the second pipe 2. Due to the central clamp 1, the two outer supports 51, 52 are moved inwards or outwards by the same distance, but the deviation in the external diameter of the pipes can be compensated by the movable arrangement of the coupling mechanism consisting of the first and second clamping lever 62, 63 and the clamping lever pin 61. Due to the spring loading by the second compression springs 60' the inner second clamping jaw 58 is moved somewhat further inwards than the inner first clamping jaw 56 when the second pipe 3 is securely clamped. As a result, the entire coupling system 61, 62, 63 tilts somewhat in the anticlockwise direction, and the axis of rotation of the clamping lever pin 61 moves slightly to the left towards the first individual clamp 71. As a result, the upper arm 62a of the first clamping lever 62 is likewise moved slightly to the left in the direction of the first individual clamp 71 in FIG. 10 and securely clamps the first pipe 2 of smaller diameter.

It is essential that the axis spacing A of the two pipes 2, 3 always remains constant. The spacing is the same between the two pipes 2, 3 of minimum diameter D1=D2=min shown in FIG. 9 as between the two pipes 2, 3 of maximum diameter D1=D2=max shown in FIG. 8 and is the same in the case of the pipes 2, 3 of different diameter D1≠D2 shown in FIG. 10.

LIST OF REFERENCE SIGNS 1 twin clamp
2 metal pipe
3 metal pipe
4 slot
6 saw blade
10 first clamping jaw
11 second clamping jaw
13 movable intermediate clamping piece
20 first bearing face
21 first bearing face 22 second bearing face
23 second bearing face
30 first double clamping jaw
31 second double clamping jaw
50 central clamp
51 first support
52 second support
55 first outer clamping jaw
56 first inner clamping jaw
57 second outer clamping jaw
58 second inner clamping jaw
59 guide pin
60 first compression spring pin
60' second compression spring pin
61 clamping lever pin
62 first clamping lever
62a arm
62b arm
63 second clamping lever
71 first individual clamp
72 second individual clamp
80 pincer-type feed system
81 receiving area
82 receiving area
A axis spacing
D1 pipe diameter
D2 pipe diameter
E asymmetry
L longitudinal direction
S clamping direction

The invention claimed is:

1. Twin clamp for two longitudinal profiles (2, 3) arranged next to one another and oriented in a longitudinal direction (L), said twin clamp comprising:
   a first individual clamp (71), which has an inner first clamping jaw (56) and an outer first clamping jaw (55); and
   a second individual clamp (72), which has an inner second clamping jaw (58) and an outer second clamping jaw (57), which individual clamps are mechanically coupled to one another via at least one first movably mounted clamping lever (62) and at least one second movably mounted clamping lever (63), wherein
   the at least one first clamping lever (62) is operatively connected to the inner first clamping jaw (56) and to the outer first clamping jaw (55) and the at least one second clamping lever (63) is operatively connected to the inner second clamping jaw (58) and to the outer second clamping jaw (57), and
   comprising at least one first spring device (60) which pushes apart the inner first clamping jaw (56) and the outer first clamping jaw (55) counter to a force exerted by the at least one first clamping lever (62), and
   at least one second spring device (60') which pushes apart the inner second clamping jaw (58) and the outer second clamping jaw (57) counter to a force exerted by the at least one second clamping lever (63); and
   the at least one first clamping lever (62) and the at least one second clamping lever (63) are mounted such as to be able to rotate about a common axis.

2. Twin clamp according to claim 1, characterized in that the first and second clamping levers (62, 63) are designed to be mutually supported against one another on a rear side.

3. Twin clamp according to claim 1, characterized in that the common axis is freely movable relative to the twin clamp (1).

4. Twin clamp according to claim 1, characterized in that the at least one first clamping lever (62) bears against the inner first clamping jaw (56) and the outer first clamping jaw (55), and the at least one second clamping lever (63) bears against the inner second clamping jaw (58) and the outer second clamping jaw (57).

5. Twin clamp according to claim 1, characterized in that the first clamping lever (62) and the second clamping lever (63) each have a plane of mirror symmetry.

6. Twin clamp according to claim 1, characterized in that the first and the second individual clamps (71, 72) are arranged on a central clamp (50).

* * * * *